US008891502B2

(12) United States Patent
Baek et al.

(10) Patent No.: US 8,891,502 B2
(45) Date of Patent: Nov. 18, 2014

(54) APPARATUS AND METHOD FOR PROVIDING SECURITY OF A NETWORK CONNECTION

(75) Inventors: Young Cheon Baek, Seoul (KR); Young Jo Kang, Seoul (KR)

(73) Assignee: Pantech Co., Ltd., Seoul (KR)

(*) Notice: Subject to any disclaimer, the term of this patent is extended or adjusted under 35 U.S.C. 154(b) by 138 days.

(21) Appl. No.: 13/618,333

(22) Filed: Sep. 14, 2012

(65) Prior Publication Data

US 2013/0070744 A1  Mar. 21, 2013

(30) Foreign Application Priority Data

Sep. 19, 2011 (KR) .................. 10-2011-0093918

(51) Int. Cl.
*H04W 4/00* (2009.01)
*H04W 12/12* (2009.01)
*H04W 88/08* (2009.01)
*H04W 84/12* (2009.01)

(52) U.S. Cl.
CPC .............. *H04W 12/12* (2013.01); *H04W 88/08* (2013.01); *H04W 84/12* (2013.01)
USPC ........................................................ 370/338

(58) Field of Classification Search
CPC combination set(s) only.
See application file for complete search history.

(56) References Cited

U.S. PATENT DOCUMENTS

| | | | |
|---|---|---|---|
| 2005/0128988 A1* | 6/2005 | Simpson et al. | 370/338 |
| 2005/0185626 A1* | 8/2005 | Meier et al. | 370/338 |
| 2006/0135068 A1* | 6/2006 | Jaakkola et al. | 455/41.2 |
| 2007/0079376 A1* | 4/2007 | Robert et al. | 726/23 |
| 2008/0198826 A1* | 8/2008 | Won | 370/338 |
| 2008/0253302 A1* | 10/2008 | Nago | 370/254 |
| 2008/0298333 A1* | 12/2008 | Seok | 370/338 |
| 2010/0067406 A1* | 3/2010 | Suzuki | 370/254 |
| 2010/0296441 A1* | 11/2010 | Barkan | 370/328 |
| 2011/0113243 A1* | 5/2011 | Kelsey et al. | 713/166 |
| 2012/0072976 A1* | 3/2012 | Patil et al. | 726/6 |
| 2012/0304297 A1* | 11/2012 | Chung et al. | 726/23 |
| 2012/0329475 A1* | 12/2012 | Ribaudo et al. | 455/456.1 |
| 2013/0051303 A1* | 2/2013 | Huang et al. | 370/312 |
| 2013/0070744 A1* | 3/2013 | Baek et al. | 370/338 |
| 2013/0231151 A1* | 9/2013 | Kneckt et al. | 455/515 |

FOREIGN PATENT DOCUMENTS

| | | |
|---|---|---|
| JP | 2007-043259 | 2/2007 |
| JP | 2009-182391 | 8/2009 |
| KR | 1020110038397 | 4/2011 |

* cited by examiner

*Primary Examiner* — Jung-Jen Liu
(74) *Attorney, Agent, or Firm* — H.C. Park & Associates, PLC

(57) ABSTRACT

A terminal includes: a frame management unit to manage medium access control (MAC) frame information; an access time management unit to record time according to the terminal communicating with a wireless access point (AP); a conversion performing unit to modify the frame information based on the time; and a management storage unit to store the modified frame information. A method for providing security includes: at a mobile terminal, delivering mobile frame information to and requesting AP frame information from a wireless AP; at the wireless AP, delivering the AP frame information to and requesting modified mobile frame information from the mobile terminal; at the mobile terminal, delivering the modified mobile frame information to and requesting the modified AP frame information from the wireless AP; and at the wireless AP, delivering the modified AP information. A wireless AP manages modified MAC frame information.

16 Claims, 8 Drawing Sheets

APPARATUS AND METHOD FOR PROVIDING SECURITY OF A NETWORK CONNECTION

CROSS-REFERENCE TO RELATED APPLICATION

This application claims priority from and the benefit under 35 U.S.C. §119(a) of Korean Patent Application No. 10-2011-0093918, filed on Sep. 19, 2011, which is hereby incorporated by reference for all purposes as if fully set forth herein.

BACKGROUND

1. Field

Exemplary embodiments of the present invention relate to preventing a connection to a cloned access point (AP) and preventing an automatic connection to the cloned AP having a same service set identifier (SSID) in a wireless local area network (WLAN) as an authorized wireless AP, and more particularly, to an apparatus and method for providing the security of a network connection.

2. Discussion of the Background

Korean Patent-Application No. 10-2011-0038397 discloses a method for setting a wireless local area network (WLAN). An image display device may be used, and an access point (AP) may generate an encryption key, display the generated encryption key on a display, transmit the generated encryption key to a wireless router, and allow connection to the wireless router based on the transmitted encryption key.

A terminal may minimize a number of alterations made by a user when setting the WLAN, may set the WLAN using the encryption key displayed on the image display device, to ensure security.

The method for setting the WLAN using the image display device that supports the WLAN may correspond to a security management method based on a wireless AP. Communication with a predetermined wireless AP may be performed by transmitting an authentication number used by the predetermined wireless AP when connecting to the predetermined wireless AP. Thus, a terminal allowed by the predetermined wireless AP may be connected, and a terminal rejected by the predetermined wireless AP may be disconnected, which may help prevent unauthorized or not allowed connections of terminals and maintain a secure communication environment.

However, in the security management method based on a wireless AP, a terminal connected to the wireless AP may be subject to a compromise, and may fail to recognize the security compromised because a cloned AP has the same service set identifier (SSID). As such, the terminal may be connected to the cloned wireless AP according to a request from the cloned wireless AP to exchange information, which may put a significant amount of user information at risk of being compromised.

The terminal may attempt access to a wireless AP other than the same wireless AP in response to recognition of an SSID by attempting automatic access to the wireless AP, which may lead to access to a cloned wireless AP having the same SSID. In this instance, the terminal may not recognize compromise from a cloned AP, and may allow complete access to the cloned AP to exchange data, which may cause a security compromise.

A security method based on a wireless AP may repeatedly use a destination address (DA) and a source address (SA) corresponding to unique information. Additionally, the terminal may use an SSID when connecting to a network, and a non-authorized user may obtain information even though the user is unauthorized to do so.

SUMMARY OF THE INVENTION

Exemplary embodiments of the present invention provide an apparatus and method for providing security of a network connection, and specifically to provide security when a mobile terminal accesses a wireless access point (AP) in a WLAN from a cloned AP.

Additional features of the invention will be set forth in the description which follows, and in part will be apparent from the description, or may be learned by practice of the invention.

An exemplary embodiment of the present invention discloses a terminal, including: a frame management unit to manage medium access control (MAC) frame information; an access time management unit to record time according to the terminal communicating with a wireless access point (AP); a conversion performing unit to modify the frame information based on the time; and a management storage unit to store the modified frame information.

An exemplary embodiment of the present invention discloses a method for providing security, including: at a mobile terminal, delivering mobile frame information to and requesting AP frame information from a wireless access point (AP); at the wireless AP, delivering the AP frame information to and requesting modified mobile frame information from the mobile terminal; at the mobile terminal, delivering the modified mobile frame information to and requesting the modified AP frame information from the wireless AP; and at the wireless AP, delivering the modified AP information.

An exemplary embodiment of the present invention discloses a wireless access point (AP), including: a frame management unit to manage MAC frame information; an access time management unit to record time of the wireless AP communicating with a terminal; a conversion performing unit to modify the frame information based on a time; and a management storage unit to store the modified frame information.

An exemplary embodiment of the present invention discloses a method for providing security, including: delivering mobile frame information to and requesting access point (AP) frame information from a first wireless AP; receiving the AP frame information and a request for modified mobile frame information from the first wireless AP; transmitting the modified mobile frame information and a request for modified AP frame information to the first wireless AP; and receiving the modified AP information from the first wireless AP.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION OF THE ILLUSTRATED EMBODIMENTS

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the description, details of well-known features and techniques may be omitted to avoid unnecessarily obscuring the presented embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Referring to terms used hereinafter, a medium access control (MAC) frame of a mobile terminal may correspond to mobile frame information, and a MAC frame of an AP may correspond to AP frame information. Further, a modified (or converted) MAC frame of the mobile terminal may correspond to mobile frame conversion information, and a modified (or converted) MAC frame of the AP may correspond to AP frame conversion information. A scheme for the mobile terminal and the AP to operate using frame information will be described in the following.

Figure 1:
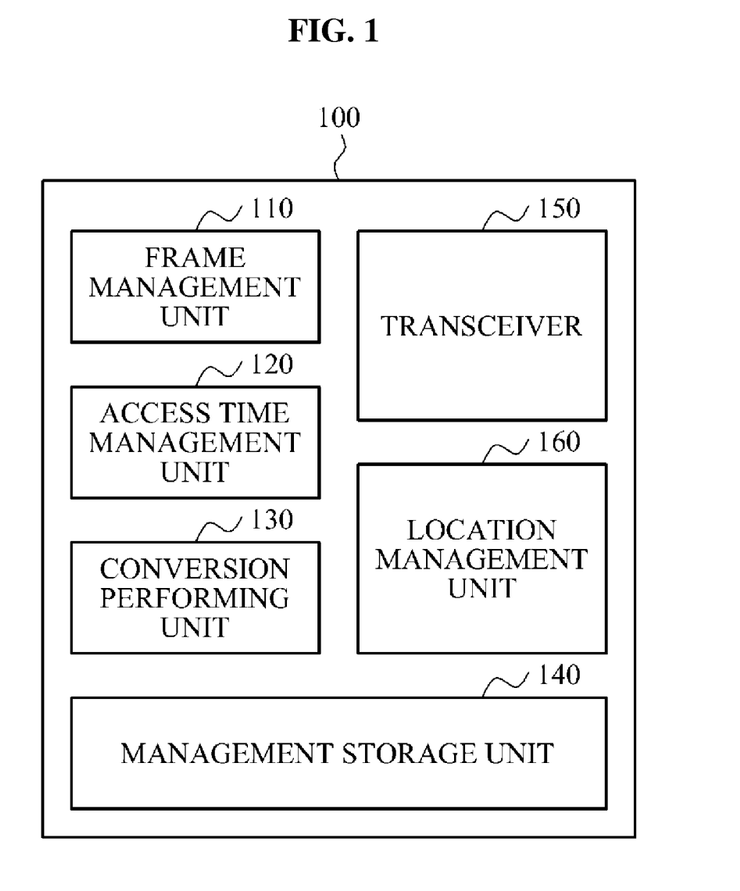
FIG. 1 is a diagram illustrating a terminal according to an exemplary embodiment of the present invention.

FIG. 1 is a diagram illustrating a terminal according to an exemplary embodiment of the present invention.

Referring to FIG. 1, a terminal 100 may include a frame management unit 110, an access time management unit 120, a conversion performing unit 130, a management storage unit 140, a transceiver 150, and a location management unit 160.

The frame management unit 110 may manage a MAC frame unique to the terminal 100. The MAC frame may include a destination address (DA) and a source address (SA).

The access time management unit 120 may monitor a start time of accessing a wireless access point (AP) and a completion time for completing access to the AP. The access time management unit 120 may record the start time at which the terminal 100 accesses the wireless AP, and may record and monitor the completion time for completing access.

The conversion performing unit 130 may perform an operation to combine a unique MAC frame of a terminal 100 and a reference time corresponding to the start time of an access and the completion time of an access, so as to modify a MAC frame.

The management storage unit 140 may store and manage, for a reference allowable period, the modified MAC frame at the terminal 100 and a modified MAC frame at the wireless AP.

The transceiver 150 may establish a data channel by performing wireless communication with the wireless AP. The location management unit 160 may determine a location of the terminal 100, and may manage information about the location.

For example, the aspects disclosed herein may be trigged by a determined or detected location. Thus, a mobile terminal may request MAC information (modified or un-modified), if a mobile terminal is moved to another location, and thus in the range of another beacon signal or cloned AP.

Figure 2:
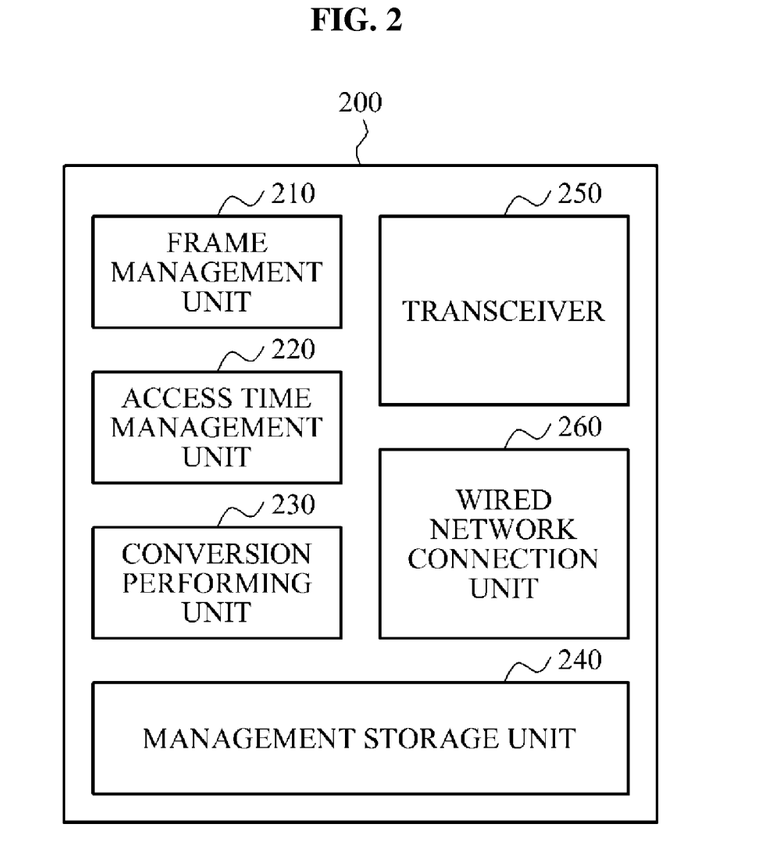
FIG. 2 is a diagram illustrating a wireless access point (AP) according to an exemplary embodiment of the present invention.

FIG. 2 is a diagram illustrating a wireless access point (AP) according to an exemplary embodiment of the present invention.

Referring to FIG. 2, a wireless AP 200 may include a frame management unit 210, an access time management unit 220, a conversion performing unit 230, a management storage unit 240, a transceiver 250, and a wired network connection unit 260.

The frame management unit 210 may manage a unique MAC frame of the wireless AP 200. "Unique" according to the current disclosure refers to a one-to-one relationship within a defined network or zone provided by the network or an access point, but the same unique code or frame may be used by a different element within a different network or zone.

The access time management unit 220 may monitor a start time of accessing a terminal and a completion time of access. The access time management unit 220 may record the start time of accessing the terminal, and may record and monitor the completion time for completing access.

The conversion performing unit 230 may perform an operation to combine the unique MAC frame of the wireless AP 200 and a reference time corresponding to the start time of access and the completion time of completing access, so as to modify a MAC frame.

The management storage unit 240 may store and manage, for a reference allowed period, a modified MAC frame of the wireless AP 200 and a modified MAC frame of the terminal.

The transceiver 250 may establish a data channel by wireless communication with the terminal. The wired network connection unit 260 may connect, to a wired network, data exchanged through a wirelessly established data channel to perform a data exchange.

TABLE 1

MAC Frame specification

| Frame Control | Duration/ID | Address1 (DA) | Address2 (SA) | Address3 (BSSID) | Sequence Control | Address4 | Frame Body | FCS | |
|---|---|---|---|---|---|---|---|---|---|
| 2 | 2 | 6 | 6 | 6 | 2 | 6 | 0~2312 | 4 | Byte |

The MAC frame may include a destination address (DA) and a source address (SA). As the DA, a wireless AP may transmit information about a terminal, and the terminal may transmit information about the wireless AP. As the SA, the wireless AP may transmit information about the wireless AP, and the terminal may transmit information about the terminal. Table 1 shows a MAC frame specification. The Byte component may indicate the number of bytes allocated to each parameter.

TABLE 2

| Vender Code | Serial Number | |
|---|---|---|
| 3 | 3 | Byte |

The DA and the SA may include a vendor code corresponding to an identifier (ID) of a Local Area Network (LAN) card manufacturer and a serial number corresponding to an address individually assigned, such as by a manufacturer. Table 2 indicates an example structure, and the bytes associated to a vendor code and serial number.

TABLE 3

Storage and management table for DA and SA of wireless AP

| DA of terminal | SA of wireless AP | DA of converted terminal | SA of converted wireless AP | reference time | allowed period | |
|---|---|---|---|---|---|---|
| 6 | 6 | 6 | 6 | 1 | 1 | Byte |

A storage and management table (as shown in Table 3) for the DA and SA of the wireless AP may include the DA of the terminal, the SA of the wireless AP, the DA of a converted terminal, the SA of a converted wireless AP, a reference time, and an allowed period.

The DA of the terminal may correspond to a unique DA of a connected terminal, the SA of the wireless AP may correspond to a unique SA of the wireless AP, the DA of a converted terminal may correspond to a converted DA of a terminal calculated and combined with the reference time, the SA of a converted wireless AP may correspond to a converted SA of the wireless AP calculated and combined with the reference time, the reference time may correspond to a start time of access and a completion time of access, and the allowed period may correspond to information about an allowed time of the converted DA and SA. In this disclosure, allowed time may refer to a specific or reference time in which a terminal (associated with a SA) may interact and exchange data with a wireless AP (associated with a DA).

TABLE 4

Storage and management table for DA and SA of terminal

| DA of wireless AP | SA of terminal | DA of converted wireless AP | SA of converted terminal | reference time | allowed period | |
|---|---|---|---|---|---|---|
| 6 | 6 | 6 | 6 | 1 | 1 | Byte |

A storage and management table (as shown in Table 4) for the DA and SA of the terminal may include the DA of the wireless AP, the SA of the terminal, the DA of a converted wireless AP, the SA of a converted terminal, a reference time, and an allowed period.

The DA of the wireless AP may correspond to a unique DA of the wireless AP, the SA of the terminal may correspond to a unique SA of the terminal, the DA of the converted wireless AP may correspond to a converted DA of the wireless AP calculated and combined with the reference time, the SA of a converted terminal may correspond to a converted SA of the terminal calculated and combined with the reference time, the reference time may correspond to a start time of access and a completion time of access, and the allowed period may correspond to information about an allowed time of the converted DA and SA.

Figure 3:
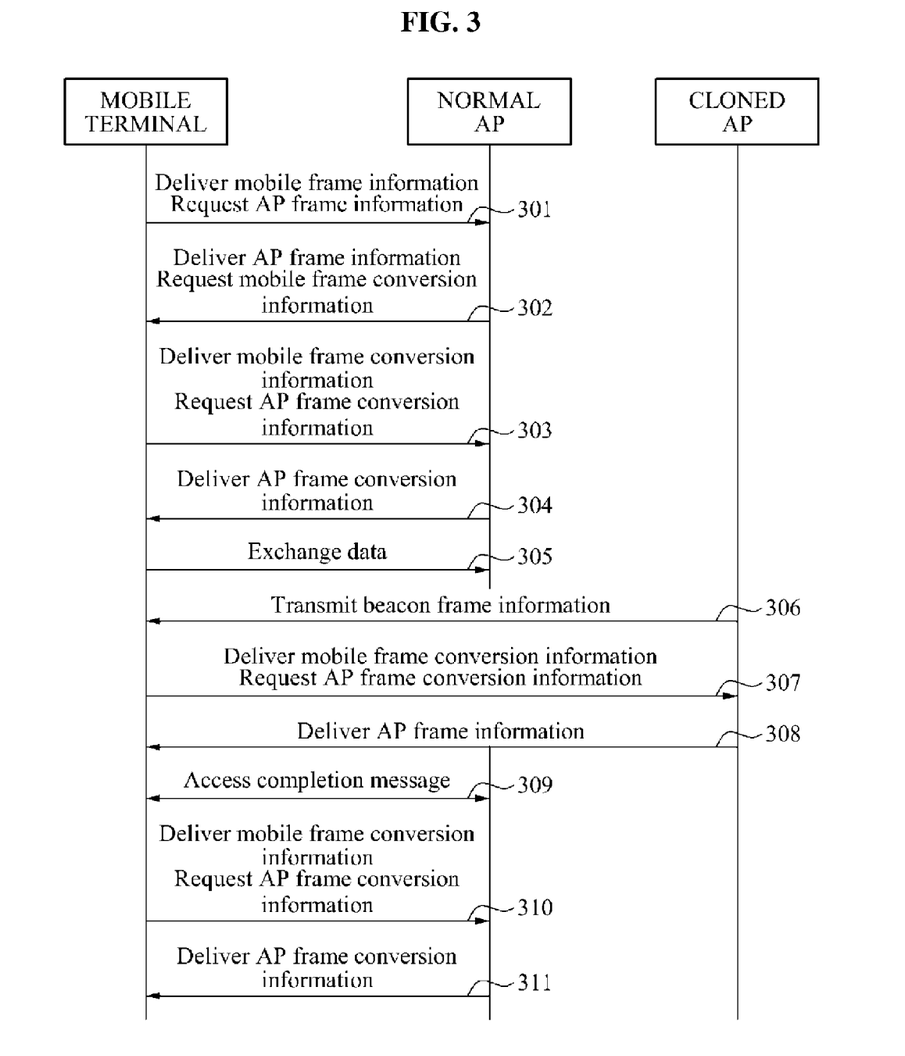
FIG. 3 is a flowchart illustrating a method for communicating with a normal AP according to an exemplary embodiment of the present invention.

FIG. 3 is a flowchart illustrating a method for communicating with a normal AP according to an exemplary embodiment of the present invention.

In operation 301, the mobile terminal may deliver the mobile frame information to a normal AP, and may request AP frame information. A normal AP may refer to a wireless AP that is authenticated and authorized to interact and exchange data with the mobile terminal. Thus, a normal AP may be duplicated to manage a cloned AP.

In operation 302, the normal AP may deliver the AP frame information to the mobile terminal, and may request a first process for the mobile frame information.

This process may refer to an additional security process. Thus, by adding or attaching this security along with the AP frame information, a subsequent transaction may be verified. Alternatively or in addition to, a request for a first process may correspond to a request for a receiving terminal or wireless AP to generate and provide converted or modified frame information.

In operation 303, the mobile terminal may generate the mobile frame conversion information in response to the request for the first process, and may request a second process for the AP frame information while delivering the mobile frame conversion information to the normal AP.

As with the first process, the second process may also serve as an additional security step in the exchange of data between a mobile terminal and an AP. Alternatively or in addition to, a request for a first process may correspond to a request for a receiving terminal or wireless AP to generate and provide converted or modified frame information.

In operation 304, the normal AP may generate the AP frame conversion information in response to the request for the second process, and may deliver the AP frame conversion information to the mobile terminal.

In operation 305, the mobile terminal and the normal AP may set a session for a data exchange, and may exchange data.

In response to the mobile terminal receiving beacon frame information from the cloned AP in operation 306, the mobile terminal may deliver the mobile frame conversion information to the cloned AP in operation 307. In this instance, the mobile terminal may request the cloned AP for the AP frame conversion information.

In operation 308, the mobile terminal may verify whether information received from the cloned AP matches the AP frame conversion information included in the mobile terminal, and may invalidate the beacon frame information if the information received from the cloned AP fails to match the AP frame conversion information.

In operation 309, the mobile terminal may complete a data exchange with the normal AP, and may exchange an access completion message.

In operation 310, to start a data exchange with the normal AP, the mobile terminal may deliver the mobile frame conversion information to the normal AP, and may request the AP frame conversion information from the normal AP.

In operation 311, the normal AP may deliver the AP frame conversion information to the mobile terminal to set a session for a data exchange.

Figure 4:
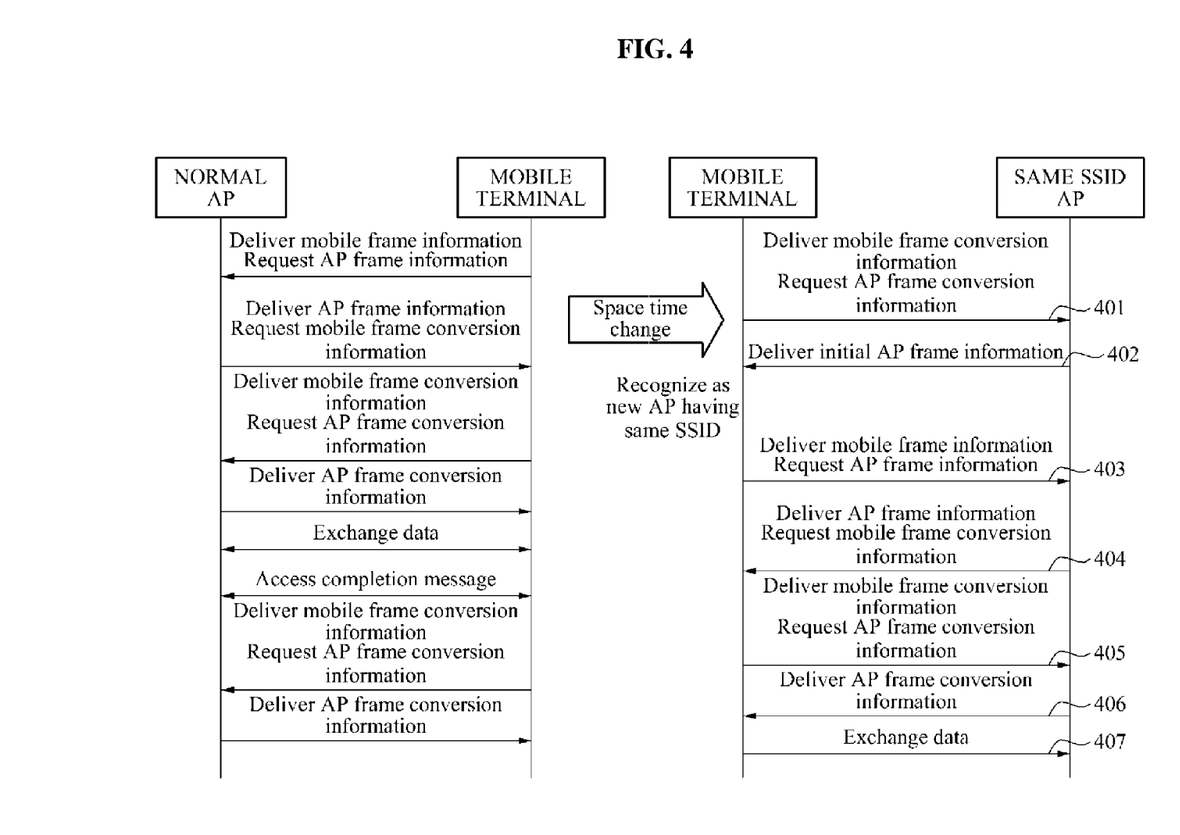
FIG. 4 is a flowchart illustrating a method for requesting a connection to a cloned AP according to exemplary embodiments of the present invention.

FIG. 4 is a flowchart illustrating a method for requesting a connection to a cloned AP according to exemplary embodiments of the present invention.

A mobile terminal may terminate access after completing a data exchange with a normal (or authorized) AP, and then move to a different communication environment (i.e. hereinafter referred to as a "space-time change"), in which the mobile terminal accesses a different AP (such as one with a same SSID, i.e. a cloned AP).

The mobile terminal may verify an ID of an AP that transmits beacon frame information, and may invalidate the beacon frame information if a connection history of the verified ID is absent. In this instance, the mobile terminal may perform a connection process if the connection history of the verified ID is included. Thus, in this way, the mobile terminal may be able to ascertain that an AP is an authentic AP, and not a false one, with cloned parameters, thereby attempting to compromise the mobile terminal's security.

In operation 401, in response to detecting an AP having the same SSID, the mobile terminal may deliver mobile modified frame information to the AP, and may request AP modified frame information from the AP.

In operation 402, in response to a request for the AP modified frame information from the mobile terminal, the AP having the same SSID may deliver unique AP frame information to the AP. This may occur because the cloned AP may not be privy to the modified AP frame information, and thus unable to provide the modified AP frame information when requested.

In operation 403, the mobile terminal may recognize the AP having the same SSID as a new AP having the same SSID, and may deliver mobile frame information to the AP having the same SSID and request the AP frame information from the AP having the same SSID.

In operation 404, the AP having the same SSID may deliver the AP frame information to the mobile terminal, and may request a first process from the mobile terminal for the AP frame information.

In operation 405, the mobile terminal may generate the mobile frame conversion information in response to the request for the first process, and may request a second process for the AP frame information while delivering the mobile frame conversion information to the AP having the same SSID.

As noted above, the first and second processes may be various schemes for authenticating access between the terminal and the same SSID AP. For example, the first process may be a request that the same SSID AP augment the mobile frame conversion information with information about previous connection history. The second process may be an attempt by the same SSID AP to perform this task. In this way, the mobile terminal may authenticate and verify the same SSID AP as an authorized AP or a cloned AP attempting to compromise the security of the terminal.

In operation 406, the AP having the same SSID may generate AP frame conversion information in response to the request for the second process, and may deliver the AP frame conversion information to the mobile terminal.

In operation 407, the mobile terminal and the AP having the same SSID may set a session for a data exchange, and may exchange data.

After operation 403, the mobile terminal may be aware that the AP it is communicating with is a cloned AP. Thus, the mobile terminal may take various actions to protect its data. For example, the mobile terminal may share new information with the cloned AP, and not information gathered while communicating with the normal AP. Alternatively, the mobile terminal may disallow access to the cloned AP.

Generation and Management of a DA and SA (Preservation Table):

Information about a DA and SA of a MAC frame may be used as information exchanged between a wireless AP and a terminal when attempting access. The DA and SA may correspond to unique information of the wireless AP and the terminal. However, a cloned AP may copy the unique information of the wireless AP. In response to a request for access from the cloned AP that copies the unique information, the terminal may not recognize the cloned AP, and may prevent an exchange of information between the terminal and the cloned AP.

A security management based on the wireless AP may involve attempting to access the cloned AP, which may not be prevented unless the terminal performs verification. Thus, the wireless AP and the terminal may provide security by generating a preservation table used for access, and the corresponding information generated and used may be stored and managed for subsequent use, thereby providing security.

The preservation table may be generated using information about the DA and the SA included in the MAC frame. The information about the DA may correspond to a destination, and the information about the SA may correspond to a source. The DA of the wireless AP may correspond to the SA of the terminal, and the DA of the terminal may correspond to the SA of the wireless AP. The SA of the wireless AP may correspond to the SA unique to the wireless AP, and the SA of the terminal may correspond to the SA unique to the terminal. Accordingly, the wireless AP may transmit information including the SA of the wireless AP and the DA of the terminal, and the terminal may transmit information including the SA of the terminal and the DA of the wireless AP, thereby distinguishing the SA and the DA of information.

When initial access is performed between the wireless AP (a normal or authorized AP) and the terminal, information about the DA and the SA of the MAC frame may correspond to the DA and the SA unique to the wireless AP, and the DA and the SA unique to the terminal. The wireless AP and the terminal may generate a converted DA and SA by calculating and combining the respective DA and SA with an access start time and an access completion time, and may share and store the converted DA and SA. The converted DA and SA may be used for a reconnection. In this way, because the wireless AP is privy to the time of connection between the terminal and the authorized AP, and a cloned AP is not, security may be ensured.

A storage and management table for the DA and the SA may include information about an initial and unique DA and SA or information about a converted DA and SA generated by calculating and combining the DA and SA with various parameters about the interaction between a terminal and AP, such as the access start time and the access completion time. The wireless AP and the terminal may store the access start time and the access completion time as a reference time to be used for a conversion. An allowed period for use of information about the converted DA and SA may be set, and the information about the converted DA and SA may be stored and managed in the wireless AP and the terminal during the allowed period and may be stored in an integrated server after expiration of the allowed period, thereby decreasing a load of the wireless AP and the terminal and efficiently managing information. Additionally, converting the DA and SA by the reference time may be performed by the wireless AP, by the terminal, or by each of the wireless AP and the terminal.

Operation According to a Request for Access from a Cloned AP:

If a terminal accesses a normal AP, the terminal and the normal AP may exchange information about a DA and SA. The information may not be used as is, and may be calculated and combined by a reference time to be a converted DA and SA. A wireless AP and the terminal may share and store the converted DA and SA.

After connection between a normal AP and the terminal is terminated (either by overt action, or the terminal changing location), the terminal may receive a connection request message from a cloned AP through a beacon frame. The cloned AP may correspond to an AP having the same SSID, the same DA and SA, and may not transmit information about the converted DA and SA requested by the terminal. The terminal may consider a wireless AP that has the same SSID, the same DA and SA, and is enabled, but unable to transmit the converted DA and SA generated and shared with the normal AP to be a cloned wireless AP.

A terminal recognizing the source AP as a cloned AP may identify this AP as a non-valid connection point, and reject a connection request, and may automatically discard the same beacon frame received thereafter, thereby defending against additional attempts at a security compromise.

Operation According to a Request for an Automatic Connection from a Wireless AP Having the Same SSID:

A request for a connection from the wireless AP may occur after initial communication with a wireless AP having the same SSID. In response to the request for a connection from the wireless AP having the same SSID, a connection may be automatically completed and data may be exchanged, which may later be used for compromising the security of the original SSID AP or the mobile terminal.

Accordingly, a WLAN environment may be compromised due to an automatic connection to the same SSID. This security compromise may be avoided by using the converted DA and SA, as described above. Thus, a terminal may remember an SSID of a wireless AP performing initial communication to be used for a reconnection. The terminal may use the converted DA and SA information in addition to using the SSID for a reconnection, thereby requesting a wireless AP for a converted DA and SA information in response to a request for connecting to the same SSID. In this instance, the wireless AP having the same SSID may not be able to transmit the corresponding information, and may transmit a DA and SA unique to the wireless AP. The terminal receiving this information may recognize the DA and SA information does not correspond to the DA and SA information of the authorized AP, but to new or wrong information. The request for connection may involve a series of processes performed during an initial connection in response to the terminal recognizing the request as a request for connecting from a new wireless AP. A connecting process by the terminal may prevent or reduce the risk of an automatic connection to the wireless AP using the same SSID, thereby preventing damage due to a malicious action using the automatic connection.

Figure 5:
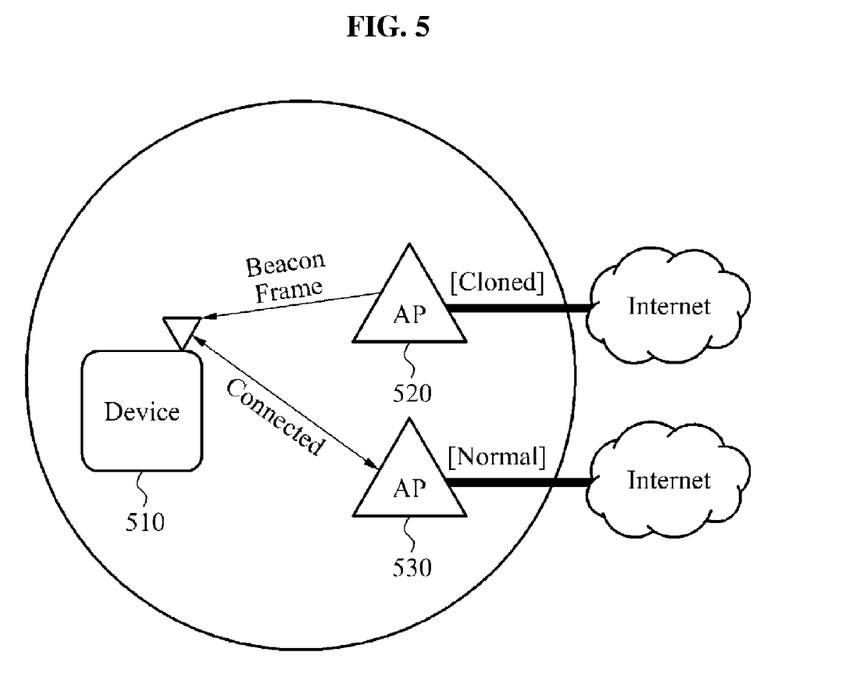
FIG. 5 is a diagram illustrating a network environment in which a cloned AP is activated during communication with a normal AP according to exemplary embodiment of the present invention.

FIG. 5 is a diagram illustrating a network environment in which a cloned AP is activated during communication with a normal AP according to exemplary embodiment of the present invention.

While a normal AP 530 and a terminal 510 are connected to each other to exchange data, the terminal 510 may receive a connection request from a cloned AP 520. When the terminal 510 receives, from the cloned AP 520, a beacon frame requesting disconnection from the normal AP 530, and a signal strength of the cloned AP 520 is greater than a signal strength of the normal AP 530, the terminal 510 may accept the request for disconnecting from the normal AP 530, and may attempt to connect with the cloned AP 520. To prevent the connection with the cloned AP 520, the terminal 510 and the normal AP 530 may exchange a DA and SA converted using information about an access time of an initial connection to a network, and may store and manage the DA and SA. If the terminal 510 performs a reconnection using the information stored and managed, and receives a connection request from the cloned AP 520, the terminal 510 may use the converted DA and SA rather than a conventional unique DA and SA (i.e. a factory set DA and SA), thereby identifying an AP initially used during a reconnection, and recognizing a connection request message from the cloned AP 520. Accordingly, the terminal 510 may avoid a security compromise with a connection with the cloned AP 520 by not responding to a connection request from the cloned AP 520, and further the terminal 510 may remain connected to the normal AP 530.

Figure 6:
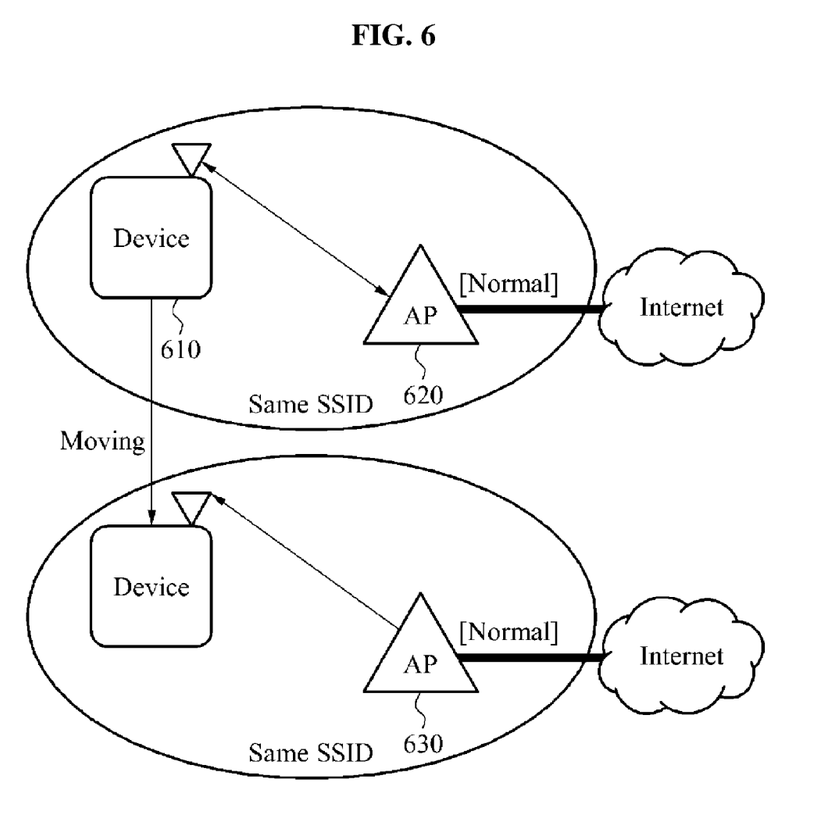
FIG. 6 is a diagram illustrating a network environment when a mobile terminal moves to an area serviced with a cloned AP according to exemplary embodiment of the present invention.

FIG. 6 is a diagram illustrating a network environment when a mobile terminal moves to an area serviced with a cloned AP according to exemplary embodiment of the present invention.

A terminal 610 may perform an automatic connection with both a normal AP 620 and a normal AP 630 having the same SSID, as long as converted information is shared between the AP 620 and AP 630. The terminal 610 may automatically access a wireless AP irrespective of user intent. The terminal 610 may generate, exchange, and store a converted DA and SA using information about a point in time at which a connection with a connected wireless AP 620 is performed and a point in time at which a connection is completed, and may store an SSID. When the terminal 610 having stored information moves and acquires information about the wireless AP 630 having the same SSID, the terminal 610 may request stored information from the wireless AP 630. The wireless AP 630, excluding information about the converted DA and SA, may transmit an SA unique to the wireless AP 630 and a DA unique to the terminal 610 and thus, the terminal 610 may recognize an AP as the wireless AP 630 having the same SSID rather than the wireless AP 620. The terminal 610 recognizing a new wireless AP may attempt to access the corresponding wireless AP 630 through an initial access process. The terminal 610 may prevent automatic access to the wireless AP 630 having the same SSID through the scheme.

Figure 7:
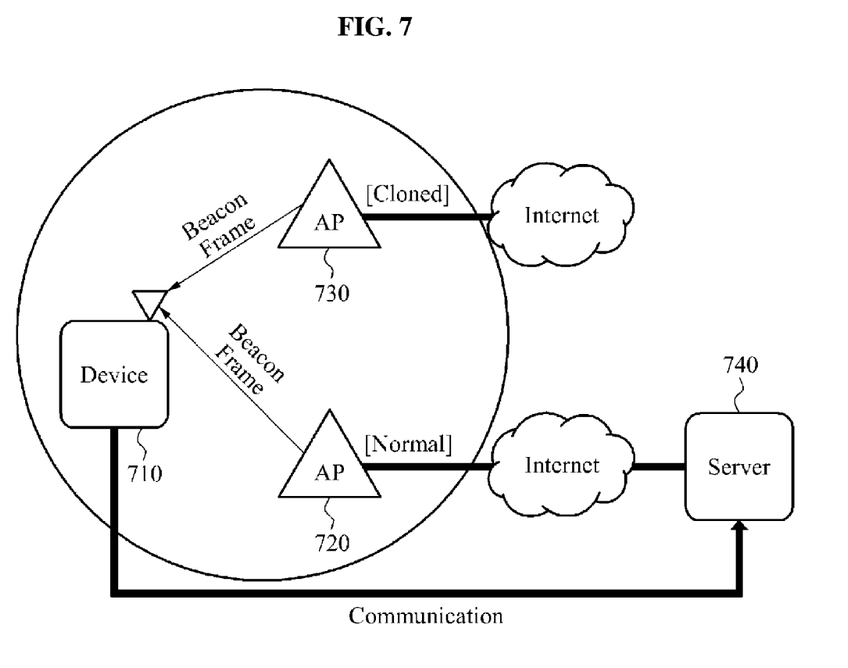
FIG. 7 is a diagram illustrating a network environment with a server connected to a normal AP and mobile terminal according to exemplary embodiment of the present invention.

FIG. 7 is a diagram illustrating a network environment with a server connected to a normal AP and mobile terminal according to exemplary embodiment of the present invention. A server 740 may be included to resolve issues. To use the server 740, information about the wireless AP 720 and location information may be registered in the server 740 that manages the wireless AP 720. The server 740 may store and manage the information about the wireless AP 720 and location information. The information about the wireless AP 720 and location information may be used for recognizing the cloned AP 730 when the normal AP 720 and the cloned AP 730 are in the same space, and the terminal 710 recognizing the cloned AP 730, and may avoid a security compromise by not attempting to access the cloned AP 730. When the terminal 710 receives a connection request message from two APs or multiple APs having the same SSID and the same MAC ID, the terminal 710 may recognize the connection request message as coming from a non-authorized or different AP based on at least the lack of addition information as described above.

The terminal 710 may recognize that the same message of two APs or multiple APs are received as abnormal messages such as duplicated messages, messages breaking a time rule due to a connection process, and the like, and may recognize a current circumstance as an abnormal circumstance. Thus, the terminal 710 may not promptly perform access to any AP, thereby preventing an automatic connection to cloned AP 730. In this instance, the terminal 710 may not have an issue when connecting to the normal AP 720. That is, the terminal 710 not promptly performing access may be connected to the server 740 through other communication techniques. For example, the terminal 710 may connect to the server through various techniques for network communication. The terminal 710 may transmit, to the server 740, a preservation table, and a converted DA and SA. The server 740 receiving the preservation table, and the converted DA and SA may search for the corresponding normal AP, and may transmit, to the corresponding wireless AP 720, data received from the terminal 710. Information transmitted by the server 740 may be delivered to the normal AP 720 registered and managed by the server 740, and the normal AP 720 receiving the information may generate a preservation table using the corresponding information, and may perform access and communication with the terminal 710 based on information about the preservation table. In response to the terminal 710 being connected to the normal AP 720, the terminal 710 may identify data of the cloned AP 730, and may avoid damage due to a security compromise by rejecting a connection request from the cloned AP 730, and by deleting data.

Figure 8:
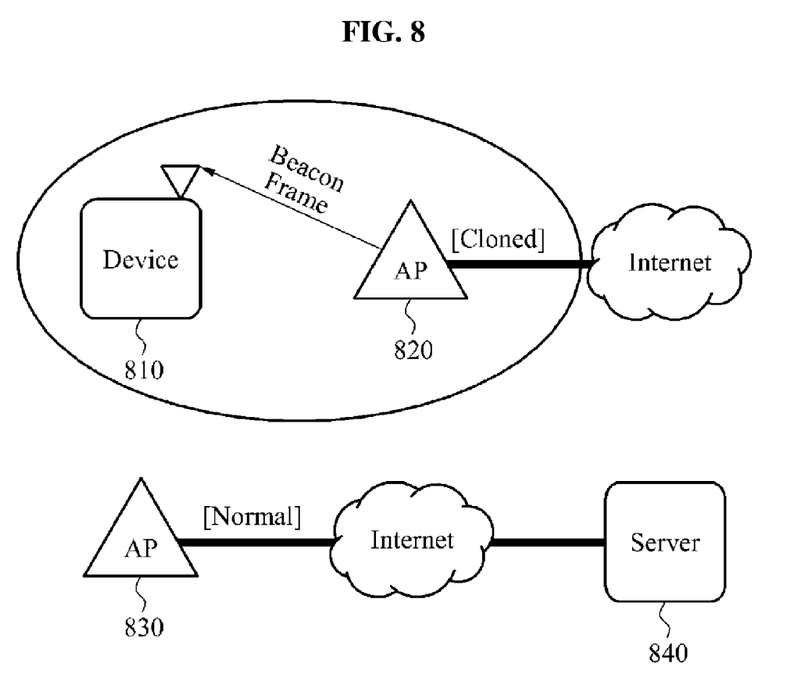
FIG. 8 is a diagram illustrating a network environment with a server connected to a normal AP according to exemplary embodiment of the present invention.

FIG. 8 is a diagram illustrating a network environment with a server connected to a normal AP according to exemplary embodiment of the present invention.

A server 840 may be used to avoid a connection attempt in response to a connection request from a cloned AP 820 located at a specific area. When a terminal 810, completing communication with a normal AP 830 moves to another location to search for another AP to be used, and detects an AP having no connection history, the terminal 810 may avoid a security compromise by recognizing the corresponding wireless AP corresponds to the cloned AP 820. To allow the terminal 810 to recognize that a wireless AP at an area that corresponds to the cloned AP 820, information about the normal AP 830 may be input to the server 840 before or after connecting with the normal AP 830, and the information may be stored and managed. Here, the information about the normal AP 830 may refer to any information for identifying a wireless AP such as an SSID, a basic service set identifier (BSSID), a MAC ID, location information, and the like. Using the stored and managed information, the terminal 810 may verify whether the corresponding AP is registered in the server 840. The AP registered and managed in the server 840 may be recognized as a safe AP, and the terminal 810 may consider the corresponding wireless AP located at the specific area to be safe and use the corresponding wireless AP. Thus, the cloned AP 820 or an AP having a malicious intent at a specific area may not be registered in the server 840. In this instance, the server 840 may inform the terminal 810 that the corresponding AP is not registered in the server 840 in response to the terminal 810 searching for the corresponding AP, and the terminal 810 informed by the server 840 may recognize the corresponding AP as an AP that is a risk to security, and may not attempt to access the corresponding AP.

The terminal 810 may avoid an attack by discarding a connection request message from the cloned AP 820 or the AP having a malicious intent. The above may be accomplished by knowing the location of the various elements, such as AP 830, AP 820 and the terminal 810.

Management of a Preservation Table (as Shown in Table 5) Using a BSSID or Address 4

TABLE 5

| MAC Frame specification | | | | | | | | |
|---|---|---|---|---|---|---|---|---|
| Frame Control | Duration/ ID | Address1 (DA) | Address2 (SA) | Address3 (BSSID) | Sequence Control | Address4 | Frame Body | FCS |
| 2 | 2 | 6 | 6 | 6 | 2 | 6 | 0~2312 | 4 Byte |

Exemplary embodiments according to the present invention may use information about a DA and SA of a MAC ID for the preservation table. The MAC ID may correspond to a factor to identify a wireless AP and a terminal, and may be used for a scheme of managing the preservation table. A MAC frame may further include a factor to identify the wireless AP and the terminal. The factor may refer to any factor to identify the wireless AP and the terminal in data included in the MAC frame. In exemplary embodiments according to the present invention, the preservation table may be generated and managed using the factor. A scheme is disclosed for providing security for a cloned AP or an AP having the same SSID using the factor.

The exemplary embodiments according to the present invention may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the well-known variety and available to those having skill in the computer software arts. Examples of computer-readable media include magnetic media such as hard disks, floppy disks, and magnetic tape; optical media such as CD ROM discs and DVD; magneto-optical media such as optical discs; and hardware devices that are specially configured to store and perform program instructions, such as non-transitory read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Thus, it is possible to provide security with a connection to a WLAN using a DA and SA of a terminal and a wireless AP, and an SSID of the AP.

According to aspects disclosed herein, it is also possible to respond to and be protected from security compromises based on communication with a cloned AP by recognizing the cloned AP, and subsequently rejecting a connection request from the cloned AP by using a converted DA and SA. The converted DA and SA may be generated by calculating and combining a DA and SA unique to a wireless AP and a terminal with a reference time, for a reconnection after initial access.

According to additional aspects disclosed herein, it is possible to provide security without causing an inconvenience to a user during an initial network access by recognizing a new AP or cloned AP when the new AP fails to provide a converted DA and SA between a terminal and a wireless AP (i.e. the previously connected to wireless AP) that has an SSID corresponding initial access, even though the new AP has the same SSID. Thus, rather than automatically accessing an AP having the same SSID, an additional security technique is incorporated to avoid a malicious security compromise through the use of a cloned AP. It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A terminal, comprising:
   a frame management unit to manage medium access control (MAC) frame information;
   an access time management unit to record time according to the terminal communicating with a first wireless access point (AP);
   a conversion performing unit to modify the MAC frame information based on the time;
   a management storage unit to store the modified MAC frame information; and
   a location management unit to detect a location change of the terminal,
   wherein the terminal allows a data exchange with a second wireless AP if the modified MAC frame information stored in the management storage unit matches modified MAC frame formation transmitted from the second wireless AP and if the location management unit detects the location change of the terminal.

2. The terminal according to claim 1, wherein if the terminal accesses the second wireless AP, the terminal requests the modified frame information from the second wireless AP.

3. The terminal according to claim 2, wherein the terminal denies a data exchange with the second wireless AP if the modified frame information stored in the management storage unit does not match the modified frame formation from the second wireless AP.

4. The terminal according to claim 2, wherein the first wireless AP and the second wireless AP comprise the same service set identifier (SSID).

5. The terminal according to claim 4, wherein the terminal receives a service beacon from the second wireless AP.

6. A method performed by a mobile terminal to provide security, the method comprising:
   delivering mobile frame information to a first wireless access point (AP) and requesting, by a processor, AP frame information from the first wireless AP;
   receiving, from the first wireless AP, the AP frame information and a request for modified mobile frame information;
   delivering the modified mobile frame information to the first wireless AP and requesting modified AP frame information from the first wireless AP;
   receiving, from the first wireless AP, the modified AP frame information;
   determining if a space-time change has occurred;
   delivering the modified mobile frame information to a second wireless AP and requesting the modified AP frame information from the second wireless AP;
   receiving initial AP frame information from the second wireless AP; and
   recognizing the second wireless AP is a clone if the initial AP frame information does not match the modified AP frame information received from the first wireless AP.

7. The method according to claim 6, further comprising:
   exchanging data between the mobile terminal and the first wireless AP; and
   after receiving an access completion notification, modifying the mobile frame information based on an end time of the exchange of data.

8. The method according to claim 6, wherein the first wireless AP and the second wireless AP comprise the same service set identifier (SSID).

9. The method according to claim 6, further comprising:
   if the second wireless AP is the clone, performing an authentication of the second wireless AP to determine if a data exchange between the second wireless AP and the mobile terminal is permitted.

10. The method according to claim 6, further comprising: receiving a beacon from the second wireless AP, the beacon is for the mobile terminal.

11. A wireless access point (AP), comprising:
a frame management unit to manage medium access control (MAC) frame information;
an access time management unit to record time of the wireless AP communicating with a terminal;
a conversion performing unit to modify the MAC frame information based on the time;
a management storage unit to store the modified MAC frame information, the modified MAC frame information being transmitted to a terminal; and
a transceiver to receive a request for modified MAC frame information from the terminal after a location change of the terminal, and to transmit the modified MAC frame information in response to the request for modified MAC frame information,
wherein a data exchange between the terminal and the wireless AP is allowed if modified MAC frame information stored in the terminal matches the modified MAC frame formation transmitted by the wireless AP in response to the request for modified MAC frame information.

12. The wireless AP according to claim 11, further comprising:
a transceiver to communicate with a server,
wherein the server communicates information to modify the MAC frame information.

13. The wireless AP according to claim 11, wherein the time comprises at least one of a start time and an end time of a data exchange between the wireless AP and the terminal.

14. A method performed by a wireless access point (AP) to provide security, the method comprising:
receiving, from a mobile terminal, mobile frame information and a request for access point (AP) frame information;
transmitting, from the wireless AP to the mobile terminal, the AP frame information and a request for modified mobile frame information;
receiving, from the mobile terminal, the modified mobile frame information and a request for modified AP frame information;
transmitting, from the wireless AP, the modified AP frame information;
receiving, from the mobile terminal, a second request for modified AP frame information after a location change of the mobile terminal; and
transmitting the modified AP frame information in response to the second request,
wherein a data exchange between the mobile terminal and the wireless AP is allowed if modified AP frame information stored in the mobile terminal matches the modified AP frame formation transmitted by the wireless AP in response to the second request.

15. The method according to claim 14, further comprising modifying, by the wireless AP, the AP frame information to generate the modified AP frame information.

16. The method according to claim 14, wherein the wireless AP and another wireless AP comprise the same service set identifier (SSID).

* * * * *